United States Patent
Guistina et al.

(10) Patent No.: US 6,258,155 B1
(45) Date of Patent: Jul. 10, 2001

(54) INK JET INK

(75) Inventors: Robert A. Guistina; Charles E. Romano, Jr.; Karen E. Maskasky, all of Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/468,412

(22) Filed: Dec. 20, 1999

(51) Int. Cl.$^7$ ..................................... C09D 11/02
(52) U.S. Cl. .................... 106/31.75; 106/31.86; 523/160; 523/161
(58) Field of Search ............... 106/31.75, 31.86; 523/160, 161

(56) References Cited

U.S. PATENT DOCUMENTS

| | | | |
|---|---|---|---|
| 4,877,451 | * 10/1989 | Winnick et al. | 106/31.6 |
| 5,129,948 | * 7/1992 | Breton et al. | 106/31.75 |
| 5,538,548 | * 7/1996 | Yamazaki | 106/31.65 |
| 5,538,549 | * 7/1996 | Kato et al. | 106/31.65 |
| 5,679,138 | * 10/1997 | Bishop et al. | 106/31.65 |
| 5,739,833 | 4/1998 | Yamazaki et al. | 347/100 |
| 5,788,759 | * 8/1998 | Takao et al. | 106/498 |
| 5,837,046 | 11/1998 | Schofield et al. | 106/31.86 |
| 5,888,287 | * 3/1999 | Brown et al. | 106/31.86 |
| 5,951,749 | * 9/1999 | Krepski et al. | 106/31.75 |

* cited by examiner

Primary Examiner—Helene KLemanski
(74) Attorney, Agent, or Firm—Harold E. Cole

(57) ABSTRACT

An ink jet ink composition comprising from about 30 to about 90% by weight of an alcohol carrier, from about 0.5 to about 30% by weight of a pigment, from about 0.125 to about 7.5% by weight of an amine-terminated polyether dispersant, and from about 10 to about 50% by weight of a humectant.

11 Claims, No Drawings

INK JET INK

CROSS REFERENCE TO RELATED APPLICATIONS

Reference is made to U.S. patent application Ser. No. 09/467,198 filed concurrently herewith, entitled "Process for Making An Ink Jet Ink", by Romano et al., the teachings of which are incorporated herein by reference.

FIELD OF THE INVENTION

This application relates to an ink jet ink using an alcohol carrier and a particular dispersant.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

In pigment-based inks, the colorant exists as discrete particles. These pigment particles are usually treated with addenda known as dispersants or stabilizers which serve to keep the pigment particles from agglomerating and settling out of the carrier. Such a dispersant is necessary to produce a colloidally stable mixture and an ink that can be "jetted" reliably without clogging the print head nozzles.

Dispersing agents in an ink jet ink have the dual function of helping to break down pigments to sub-micron size during the milling process and of keeping the colloidal dispersion stable and free from flocculation for a long period of time. In general, dispersions suffer from poor colloidal stability due to particle agglomeration and/or sedimentation, thus limiting the usefulness of the dispersions in inks.

Although a wide variety of dispersing agents are known for pigmented ink jet inks, they are not without certain problems. For example, many dispersing agents are very selective as far as being able to disperse pigments to sub-micron size. In many instances, each class of pigments may require a specific dispersing agent. Another problem encountered with some polymeric dispersing agents is that they tend to impart an undesirably high viscosity to the resulting inks. Thus, there is a continuing need for improved dispersing agents for pigmented inks, especially for non-aqueous inks.

Dispersing agents for non-aqueous ink jet inks previously used include metal salts of styrene-acrylic copolymers, metal salts of sulfonated styrene-acrylic copolymers, phosphonium salts or quaternary ammonium salts of styrene-acrylic copolymers.

U.S. Pat. Nos. 5,837,046; 5,739,833 and 5,538,548 relate to ink jet inks containing various Disperbyk® dispersants used in a variety of carriers such as aliphatic hydrocarbons and dibasic esters. However, there is a problem with these dispersants in that they do not provide very low particle size dispersions when used with alcohol carriers.

It is an object of this invention to provide an ink jet ink having a low particle size in order to obtain better covering power and which would have less tendency to clog the ink jet nozzles. It is another object of this invention to provide a non-aqueous, pigment dispersion for an ink jet ink which employs a dispersant which enables the production of nanometer-size pigment particles.

SUMMARY OF THE INVENTION

These and other objects are achieved in accordance with this invention which relates to a ink jet ink composition comprising from about 30 to about 90% by weight of an alcohol carrier, from about 0.5 to about 30% by weight of a pigment, from about 0.125 to about 7.5% by weight of an amine-terminated polyether dispersant, and from about 10 to about 50% by weight of a humectant.

The dispersant used in the ink jet ink of the invention is highly effective in reducing pigment particles to a size of less than about 100 nm when milled in the presence of very fine milling media. The resulting dispersion is characterized by nanometer-size pigment particles. The dispersing agents employed are useful with a wide variety of pigments.

DETAILED DESCRIPTION OF THE INVENTION

As noted above, the ink jet ink composition used in ink jet ink of the invention contains an amine-terminated polyether dispersant. The dispersant is preferably used in a ratio of dispersant to pigment from about 0.1:1 to about 5:1. In a preferred embodiment, the ratio of dispersant to pigment is from about 0.5:1 to about 2:1.

In a preferred embodiment of the invention, the amine-terminated polyether has the following formula:

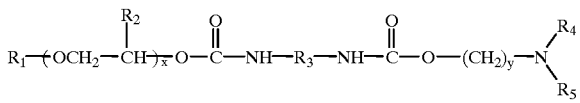

where $R_1$, $R_4$ and $R_5$ each individually represents a substituted or unsubstituted alkyl group having from 1 to about 6 carbon atoms;

$R_2$ represents hydrogen or a substituted or unsubstituted alkyl group having from 1 to about 6 carbon atoms;

$R_3$ represents a substituted or unsubstituted alkyl group having from 1 to about 10 carbon atoms or a substituted or unsubstituted aryl group having from about 6 to about 10 carbon atoms;

x is from about 5 to about 100; and y is from 1 to about 6.

In another preferred embodiment, $R_1$, $R_4$ and $R_5$ in the above formula each individually represents methyl or ethyl. In another preferred embodiment, $R_2$ is methyl. In yet another preferred embodiment, $R_3$ is a methyl-substituted aryl group. In still another preferred embodiment, x is from about 15 to about 45 and y is 2. An example of these dispersants which is commercially available is Disperbyk® BYK 182 from BYK-Chemie, USA.

In the present invention, any of the known pigments can be used. Pigments can be selected from those disclosed, for example, in U.S. Pat. Nos. 5,026,427; 5,086,698; 5,141,556; 5,160,370; and 5,169,436, the disclosures of which are hereby incorporated by reference. The exact choice of pigments will depend upon the specific color reproduction and image stability requirements for the printer and application. The pigment must be totally insoluble in the carrier. For four-color printers, combination of cyan, magenta, yellow, and black (CMYK) pigments should be used. An exemplary four color set is bis(phthalocyanyl-alumino) tetraphenyl-disiloxane cyan, quinacridone magenta (C.I. Pigment Red 122), Hansa® Brilliant Yellow 5GX-02 (C.I. Pigment Yellow 74), and carbon black (C.I. Pigment Black 7).

As noted above, the pigment particle size obtained using this process is below about 100 nm. This figure is understood to mean the $50^{th}$ percentile value (half of the particles have a particle size below that value and half are above). Particle size distributions can be measured on diluted millgrind samples (about 50:1) using a Leeds & Northrop Ultrafine Particle Analyzer (UPA).

The process of preparing inks from pigments commonly involves two steps: (a) a dispersing or milling step to break up the pigment to the primary particle, and (b) a dilution step in which the dispersed pigment concentrate is diluted with a carrier and other addenda to a working strength ink. In the milling step, the pigment is usually suspended in a carrier along with rigid, inert milling media less than about 100 μm. The dispersing agent is added at this stage. Mechanical energy is supplied to this pigment dispersion, and the collisions between the milling media and the pigment cause the pigment to deaggregate into its primary particles.

There are many different types of materials which may be used as milling media, such as glasses, ceramics, metals, and plastics. In a preferred embodiment, the grinding media can comprise particles, preferably substantially spherical in shape, i.e., beads consisting essentially of a polymeric resin.

In general, polymeric resins suitable for use as milling media are chemically and physically inert, substantially free of metals, solvent and monomers and of sufficient hardness and resilience to enable them to avoid being chipped or crushed during milling. Suitable polymeric resins include crosslinked polystyrenes, such as polystyrene crosslinked with divinylbenzene, styrene copolymers, polyacrylates such as poly(methylmethacrylate), polycarbonates, polyacetals such as Derlin® vinyl chloride polymers and copolymers, polyurethanes, polyamides, poly(tetrafluoroethylenes), e.g. Teflon®, and other fluoropolymers, high density polyethylenes, polypropylenes, cellulose ethers and esters such as cellulose acetate, poly(hydroxyethylmethacrylate), poly(hydroxyethyl acrylate), silicone containing polymers such a polysiloxanes and the like. The polymer can be biodegradable. Exemplary biodegradable polymers include poly(lactides), poly(glycolids) copolymers of lactides and glycolide, polyanhydrides, poly(imino carbonates), poly(N-acylhydroxyproline) esters, poly(palmitoyl hydroxyproline) esters, ethylene-vinylacetate copolymers, poly(orthoesters), poly(caprolactones), and poly(phosphazines). The polymeric resin can have a density from 0.9 to 3.0 g/cm³. Higher density resins are preferred inasmuch as it is believed that these provide more efficient particle size reduction. Most preferred are crosslinked or uncrosslinked polymeric media based on styrene.

Milling can take place in any suitable grinding mill. Suitable mills include an airjet mill, a roller mill, a ball mill, an attritor mill and a bead mill. A high speed mill is preferred, such as those manufactured by Morehouse-Cowles, Hockmeyer, or Premier Mills.

By high speed mill is meant a milling device capable of accelerating milling media to velocities greater than about 5 meters per second. The mill can contain a rotating shaft with one or more impellers. In such a mill the velocity imparted to the media is approximately equal to the peripheral velocity of the impeller, which is the product of the impeller rev/min and the impeller diameter. Sufficient milling media velocity is achieved, for example, in Cowles-type saw tooth impeller having a diameter of 40 mm when operated at about 6,000 to about 9,000 rev/min. The preferred proportions of the milling media, the pigment, the carrier and dispersing agent can vary within wide limits and depend, for example, upon the particular material selected and the size and density of the milling media, etc.

Batch Milling

A slurry of <100 μm milling media, carrier, pigment, and dispersing agent(s) is prepared using simple mixing. This slurry may be milled in conventional high energy batch milling processes such as high speed attritor mills, vibratory mills, ball mills, etc. This slurry is milled for a predetermined length of time to allow comminution of the active material to a minimum particle size. After milling is complete, the dispersion of active material is separated from the grinding media by a simple sieving or filtration.

The milling time can vary widely and depends upon the pigment, mechanical means and residence conditions selected, the initial and desired final particle size, etc.

The carrier can be any of the alcohols such as isopropanol, methanol, ethanol, propanol, butanol, etc. Selection of a suitable alcohol carrier depends on the requirements of the specific application, such as viscosity, surface tension, drying time of the pigmented ink jet ink, and the type of receiver on which the ink will be printed. The amount of the carrier employed is in the range of about 20 to 40 weight %, preferably about 25 to about 35 weight %, based on the total weight of the slurry.

Ink Preparation

In general, it is desirable to make the pigmented ink jet ink in the form of a concentrated millgrind, which is subsequently diluted to the appropriate concentration for use in the ink jet printing system. This technique permits preparation of a greater quantity of pigmented ink from the equipment. The millgrind is diluted with appropriate solvent to a concentration best for viscosity, color, hue, saturation density, and print area coverage for the particular application.

In the case of organic pigments, the ink may contain up to about 30% pigment by weight, but will generally be in the range of about 0.1 to 10%, preferably about 0.25 to about 5%, by weight of the total ink composition for most of the ink jet printing applications.

Acceptable viscosities, as determined using Brookfield apparatus and related methods are generally not greater than 20 centipoise, and are preferably in the range of about 1 to 15 centipoise.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

A humectant is employed in the ink jet compositions of the invention to help prevent the ink from drying out or crusting in the orifices of the printhead. Examples of humectants which can be used include monohydric alcohols with carbon chains greater than about 10 carbon atoms such as decanol, dodecanol, oleoyl alcohol, stearoyl alcohol, hexadecanol, eicosanol, polyhydric alcohols, such as ethylene glycol, alcohol, diethylene glycol(DEG), triethylene glycol, propylene glycol, tetraethylene glycol, polyethylene glycol, glycerol, 2-methyl-2,4-pentanediol, 2-ethyl-2-hydroxymethyl-1,3-propanediol(EHMP), 1,5 pentanediol, 1,2-hexanediol, 1,2,6-hexanetriol and thioglycol; lower alkyl mono- or or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, poly(ethylene glycol) monobutyl ether (PEGMBE), and diethylene glycol monobutylether (DEGMBE); nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone. In a preferred embodiment, lower alkyl mono- or di-ethers derived from alkylene glycols are used.

Polymeric binders can also be added to the ink of the invention to improve the adhesion of the colorant to the support by forming a film that encapsulates the colorant upon drying. Examples of polymers that can be used include polyesters, polystyrene/acrylates, sulfonated polyesters, polyurethanes, polyimides and the like. The polymers may be present in amounts of from about 0.01 to about 15 percent by weight and more preferably from about 0.01 to about 5 percent by weight based on the total amount of components in the ink.

A biocide may be added to the ink composition of the invention to suppress the growth of micro-organisms such as molds, fungi, etc. in aqueous inks. A preferred biocide for the ink composition employed in the present invention is Proxel® GXL (Zeneca Specialties Co.) at a final concentration of 0.0001–0.5 wt. %.

Additional additives which may optionally be present in the ink jet ink compositions of the invention include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers.

The ink jet inks provided by this invention are employed in ink jet printing wherein liquid ink drops are applied in a controlled fashion to an ink receptive substrate, by ejecting ink droplets from plurality of nozzles, or orifices, in a print head of ink jet printers.

Commercially available ink jet printers use several different methods to control the deposition of the ink droplets. Such methods are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following examples illustrate the utility of the present invention.

EXAMPLE 1

Dispersion 1 (Invention)

A yellow dispersion was prepared by mixing the following Ingredients: 9.0 g Hansa® Brilliant Yellow 5GX-02 pigment (C.I. Pigment Yellow
  74) (Hoechst Chem. Co.)
  9.5 g Disperbyk® 182 dispersing agent (BYK-Chemie USA)
  50.0 g isopropanol carrier (J T Baker Co.)
  87.5 g 50 μm polymeric milling media (crosslinked polystyrene beads).

The above components were mixed and then milled in a 0.5 liter double walled vessel obtained from BYK-Gardner using a Series 2500 HV Dispersator (an explosion-proof, high energy laboratory dispersator, manufactured by Premier Mill Corp.) with a 40 mm. Cowles-type toothed milling blade rotating at about 6,400 rev/min. To offset the solvent evaporation, additional solvent was slowly dripped into the milling slurry at a rate (~1 drop/sec) as needed to maintain good milling flow. The slurry was milled at about 15° C. for approximately 5 hours. The ink concentrate was diluted with an additional 50 g solvent and mixed for few minutes before being separated from the milling media. The dispersion was separated from the milling media by filtering the millgrind through a 10–20 μm KIMAX® Buchner Funnel obtained from VWR Scientific Products. Particle size distributions were obtained on diluted millgrind samples (about 50:1) using a Leeds & Northrop Ultrafine Particle Analyzer (UPA). The results obtained are a 50% median value. Particle size, as measured by UPA, are listed in the Table below.

To 45 g of the above dispersion was added 30 g of isopropanol and 25 g of a humectant, tripropylene glycol methyl ether, (Dowanol TPM®).

Control Dispersion 1

A yellow dispersion was attempted to be made by mixing the following ingredients:
  9.0 g Hansa® Brilliant Yellow 5GX-02 pigment (C.I. Pigment Yellow 74) (Hoechst Chem. Co.)
  26.0 g Solsperse® 13,940 dispersing agent
  50.0 g isopropanol carrier
  87.5 g 50 μm polymeric milling media The above components were mixed but not milled because the slurry was too viscous.

Control Dispersion 2

A magenta dispersion was attempted to be made by mixing the following ingredients:
  7.2 g Magenta pigment (C.I. Pigment Red 122) Sunfast® Quinacridone (Sun Chem. Co.)
  3.6 g Solsperse® 20,000 dispersing agent
  60.0 g isopropanol carrier
  87.5 g 50 μm milling media.

The above components were milled in a manner similar to that of Dispersion 1 except the milling blade tip-speed was changed to 7500 rpm. After 2 hours, the milling was discontinued because the slurry became too viscous. The results are shown in the Table below.

Control Dispersion 3

A magenta dispersion was attempted to be made by mixing the following ingredients:
  10.0 g Magenta pigment RT243D (Ciba)
  7.5 g Solsperse® 20,000 dispersing agent
  50.0 g isopropanol carrier
  87.5 g 50 μm milling media.

The above components were milled in a manner similar to that of Dispersion 1. After 1.25 hours, milling was discontinued because the slurry became too viscous. The results are shown in the Table below.

Control Dispersion 4

A yellow dispersion was attempted to be made by mixing the following ingredients:
  9.0 g Yellow pigment (C.I. Pigment Yellow 74) Irgalite® Yellow GO 9.0 g Solsperse® 20,000 dispersing agent
40.0 g isopropanol carrier
87.5 g 50 μm polymeric milling media The above components were mixed but not milled because the slurry was too viscous.

Control Dispersion 5

A magenta dispersion was attempted to be made by mixing the following ingredients:

9.0 g Magenta pigment RT243D (Ciba)
9.0 g Solsperse® 34,750 dispersing agent
60.0 g isopropanol carrier
87.5 g 50 μm milling media.

The above components were mixed but not milled because the slurry was too viscous.

Control Dispersion 6

A magenta dispersion was attempted by mixing the following ingredients:

9.0 g Magenta pigment (C.I. Pigment Red 122) Sunfast® Quinacridone (Sun Chem. Co.)
7.0 g Disperbyk® 140 dispersing agent (Byk Chemie USA)
40.0 g isopropanol carrier
87.5 g 50 μm milling media.

The above components were then milled in a manner similar to that of Dispersion 1 except that the milling speed was increased to 7800 rev/min. The results are shown in the Table below.

TABLE

| Dispersion | Dispersant | Pigment | Particle Size (nm) |
|---|---|---|---|
| 1 | Disperbyk ® 182 | Hansa ® Brilliant Yellow 5GX-02 (P.Y. 74) | 15 |
| Control 1 | Solsperse ® 13,940 | Hansa ® Brilliant Yellow 5GX-02 (P.Y. 74) | * |
| Control 2 | Solsperse ® 20,000 | Magenta (P.R. 122) Sunfast ® Quinacridone | 3600 |
| Control 3 | Solsperse ® 20,000 | Magenta Ciba RT243D | 2000 |
| Control 4 | Solsperse ® 20,000 | Irgalite Yellow GO (P.Y.74) | * |
| Control 5 | Solsperse ® 34,750 | Magenta Ciba RT243D | * |
| Control 6 | Disperbyk ® 40 | Magenta (P.R. 122) Sunfast ® Quinacridone | 1500 |

*Not measured

The above results show that use of the amine-terminated polyether dispersant in accordance with the invention produced a dispersion with particles having a particle size below about 100 nm, in contrast to the control dispersants which produced a dispersion with particles having a particle size above about 1500 nm or were not be measured because the slurry was too viscous to be milled.

The invention has been described in detail with particular reference to certain preferred embodiments thereof, but it will be understood that variations and modifications can be effected within the spirit and scope of the invention.

What is claimed is:

1. An ink jet ink composition comprising from about 30 to about 90% by weight of an alcohol carrier, from about 0.5 to about 30% by weight of a pigment, from about 0.125 to about 7.5% by weight of an amine-terminated polyether dispersant, and from about 10 to about 50% by weight of a humectant.

2. The composition of claim 1 wherein said amine-terminated polyether has the following formula:

$$R_1\text{-}(OCH_2\text{-}CH)_x\text{-}O\text{-}\underset{\underset{R_2}{|}}{\overset{O}{\overset{\|}{C}}}\text{-}NH\text{-}R_3\text{-}NH\text{-}\overset{O}{\overset{\|}{C}}\text{-}O\text{-}(CH_2)_y\text{-}N\overset{R_4}{\underset{R_5}{\diagdown}}$$

where $R_1$, $R_4$ and $R_5$ each individually represents a substituted or unsubstituted alkyl group having from 1 to about 6 carbon atoms;

$R_2$ represents hydrogen or a substituted or unsubstituted alkyl group having from 1 to about 6 carbon atoms;

$R_3$ represents a substituted or unsubstituted alkyl group having from 1 to about 10 carbon atoms or a substituted or unsubstituted aryl group having from about 6 to about 10 carbon atoms;

x is from about 5 to about 100; and y is from 1 to about 6.

3. The composition of claim 2 wherein $R_1$, $R_4$ and R5 each individually represents methyl or ethyl.

4. The composition of claim 2 wherein $R_2$ is methyl.

5. The composition of claim 2 wherein $R_3$ is a methyl-substituted aryl group.

6. The composition of claim 2 wherein x is from about 15 to about 45 and y is 2.

7. The composition of claim 1 wherein said dispersant is present in a ratio of dispersant to pigment of from about 0.1:1 to about 5:1.

8. The composition of claim 1 wherein said dispersant is present in a ratio of dispersant to pigment of from about 0.5:1 to about 2:1.

9. The composition of claim 1 wherein said dispersion contains from about 0.1 to 10% by weight of said pigment.

10. The composition of claim 1 wherein said alcohol carrier is isopropanol.

11. The composition of claim 1 wherein said humectant is a lower alkyl mono-or di-ether derived from an alkylene glycol.

* * * * *